US012592479B2

(12) United States Patent
Schaffner et al.

(10) Patent No.: US 12,592,479 B2
(45) Date of Patent: Mar. 31, 2026

(54) WIDEBAND SPIRAL ANTENNA SYSTEM FOR A VEHICLE

(71) Applicant: GM GLOBAL TECHNOLOGY OPERATIONS LLC, Detroit, MI (US)

(72) Inventors: James H. Schaffner, Chatsworth, CA (US); Duane S Carper, Davison, MI (US); Gregg R Kittinger, Oakland Township, MI (US); Venkateshwar R Aitharaju, Troy, MI (US); Hyok Jae Song, Oak Park, CA (US); David R. Petrucci, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 231 days.

(21) Appl. No.: 18/643,969

(22) Filed: Apr. 23, 2024

(65) Prior Publication Data

US 2025/0329921 A1 Oct. 23, 2025

(51) Int. Cl.
*H01Q 1/32* (2006.01)
*H01Q 1/38* (2006.01)

(52) U.S. Cl.
CPC ............... *H01Q 1/325* (2013.01); *H01Q 1/38* (2013.01)

(58) Field of Classification Search
CPC ............ H01Q 1/325; H01Q 1/38; H01Q 1/36; H01Q 9/27; H01Q 11/08; H01Q 21/28; H01Q 1/3275
See application file for complete search history.

(56) References Cited

U.S. PATENT DOCUMENTS 5,402,134 A * 3/1995 Miller ...................... H01Q 5/40 343/745
6,344,833 B1 * 2/2002 Lin ........................ H01Q 21/28 343/873
9,571,172 B2 2/2017 Song et al.
11,569,584 B2 * 1/2023 Sikes ................. H01Q 15/0053
2023/0163483 A1 * 5/2023 Harel ..................... H01Q 21/26 343/853

OTHER PUBLICATIONS

T. C. Baum, K. Ghorbani, R. W. Ziolkowski and K. J. Nicholson, "Investigation of microwave active elements embedded in composite structures," 2016 IEEE MTT-S International Microwave Symposium (IMS), San Francisco, CA, USA, 2016, pp. 1-3.

(Continued)

*Primary Examiner* — Minh Tran
*Assistant Examiner* — Minh D A
(74) *Attorney, Agent, or Firm* — Ingrassia Fisher & Lorenz, LLP | IF&L

(57) ABSTRACT

A wideband spiral antenna system for a vehicle is provided. A planar spiral antenna is fabricated on a substrate. The planar spiral antenna includes an antenna feed. A first dielectric panel is disposed adjacent to a first side of the substrate. A dielectric puck has a first puck side disposed adjacent to the antenna feed on a second side of the substrate opposing the first side of the substrate. A radio frequency (RF) connector is disposed adjacent to a second puck side of the dielectric puck. The second puck side opposes the first puck side of the dielectric puck. One or more conductive vias extend from the antenna feed through the dielectric puck to the RF connector electrically coupling the antenna feed to the RF connector.

20 Claims, 6 Drawing Sheets

(56) References Cited

OTHER PUBLICATIONS

J. Karanik, "Embedded antennas," IEEE Conference Long Island Systems, Applications and Technology, 2005., Long Island, NY, USA, 2005, pp. 26-31.

R. Sussman, The Equiangular Plane Spiral Antenna, Electronics Research Laboratory, University of California, Series No. 60, Issue No. 406. Sep. 15, 1961.

N. A. Stutzke and D. S. Filipovic, "Four-arm 2nd-mode slot spiral antenna with simple single-port feed," in IEEE Antennas and Wireless Propagation Letters, vol. 4, pp. 213-216, 2005.

* cited by examiner

WIDEBAND SPIRAL ANTENNA SYSTEM FOR A VEHICLE

INTRODUCTION

The technical field generally relates to vehicles, and more particularly relates to a wideband spiral antenna system for a vehicle.

A shark-fin radome mounted on the top of a vehicle roof is typically used to enclose 5G antennas used in a vehicle. In most cases, two 5G antennas are configured in the vehicle for two-by-two multiple-input, multiple-output (MIMO) operation. Since both of the 5G antennas are often located within a single radome, the radome may be a prominent and visible feature on the vehicle. 5G New Radio (NR) can support a higher order of MIMO operation, such as for example a four-by-four MIMO operation. A much larger radome or multiple radomes would have to be positioned on the vehicle roof to accommodate four-by-four MIMO functionality.

Dielectric materials, such as fiberglass composites and glass are increasingly being used to manufacture vehicle structures that were previously built from formed steel. It may be a challenge to install one or more shark-fin antenna radomes on the vehicle roof of non-metal vehicle structures and ensure that the radome has sufficient metal for an antenna ground plane to prevent degradation of antenna performance.

Accordingly, it is desirable to provide an improved wideband spiral antenna system for a vehicle that is conformable to a vehicle surface. Other desirable features and characteristics will become apparent from the subsequent detailed description and the appended claims, taken in conjunction with the accompanying drawings and the foregoing technical field and background.

SUMMARY

A wideband spiral antenna system for a vehicle includes a planar spiral antenna fabricated on a substrate, wherein the planar spiral antenna includes an antenna feed, a first dielectric panel disposed adjacent to a first side of the substrate, a dielectric puck having a first puck side disposed adjacent to the antenna feed on a second side of the substrate opposing the first side of the substrate, a radio frequency (RF) connector disposed adjacent to a second puck side of the dielectric puck, wherein the second puck side opposes the first puck side of the dielectric puck, and one or more conductive vias extending from the antenna feed through the dielectric puck to the RF connector electrically coupling the antenna feed to the RF connector.

In at least one embodiment, the planar spiral antenna is a logarithmic periodic spiral antenna.

In at least one embodiment, the logarithmic periodic spiral antenna is a four-arm spiral antenna.

In at least one embodiment, the wideband spiral antenna system includes a second dielectric panel disposed adjacent to the second side of the substrate, the second dielectric panel having a puck cutout with the dielectric puck extending through the puck cutout.

In at least one embodiment, the planar spiral antenna is applied as an applique affixed to an inside surface of the first dielectric panel.

In at least one embodiment, a combination of the planar spiral antenna fabricated on the substrate, the first dielectric panel, and the second dielectric panel are conformable to a curved surface.

In at least one embodiment, a thickness of the dielectric puck is the same as a thickness of the second dielectric panel.

In at least one embodiment, the first and second dielectric are one of glass panels, fiberglass panels, and fiber composite panels.

In at least one embodiment, the wideband spiral antenna system is disposed within a vehicle.

In at least one embodiment, the first and second dielectric panels are first and second dielectric panels of a vehicle.

In at least one embodiment, a combination of the planar spiral antenna fabricated on the substrate and the first dielectric panel are conformable to a curved surface.

In at least one embodiment, the substrate is one of a flexible film and a thin dielectric circuit board.

In at least one embodiment, a bandwidth of the wideband spiral antenna system is from 612 megahertz to 7125 megahertz.

In at least one embodiment, the dielectric puck has a thickness of 1 mm.

A vehicle includes a wideband spiral antenna system. The wideband spiral antenna system includes a planar spiral antenna fabricated on a substrate, wherein the planar spiral antenna includes an antenna feed, a first dielectric panel disposed adjacent to a first side of the substrate, a dielectric puck having a first puck side disposed adjacent to the antenna feed on a second side of the substrate opposing the first side of the substrate, a radio frequency (RF) connector disposed adjacent to a second puck side of the dielectric puck, wherein the second puck side opposes the first puck side of the dielectric puck, and one or more conductive vias extending from the antenna feed through the dielectric puck to the RF connector electrically coupling the antenna feed to the RF connector.

In at least one embodiment, a second dielectric panel disposed adjacent to the second side of the substrate, the second dielectric panel having a puck cutout with the dielectric puck extending through the puck cutout.

In at least one embodiment, the planar spiral antenna is applied as an applique affixed to an inside surface of the first dielectric panel.

In at least one embodiment, a combination of the planar spiral antenna fabricated on the substrate, the first dielectric panel, and the second dielectric panel are conformable to a curved surface of the vehicle.

In at least one embodiment, the wideband spiral antenna system is disposed within the vehicle.

A wideband spiral antenna system for a vehicle includes a planar spiral antenna fabricated on a substrate, wherein the planar spiral antenna includes an antenna feed, a first dielectric panel disposed adjacent to a first side of the substrate, a dielectric puck having a first puck side disposed adjacent to the antenna feed on a second side of the substrate opposing the first side of the substrate, a radio frequency (RF) connector disposed adjacent to a second puck side of the dielectric puck, the second puck side opposing the first puck side of the dielectric puck, one or more conductive vias extending from the antenna feed through the dielectric puck to the RF connector electrically coupling the antenna feed to the RF connector, and a second dielectric panel disposed adjacent to the second side of the substrate, the second dielectric panel having a puck cutout with the dielectric puck extending through the puck cutout.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
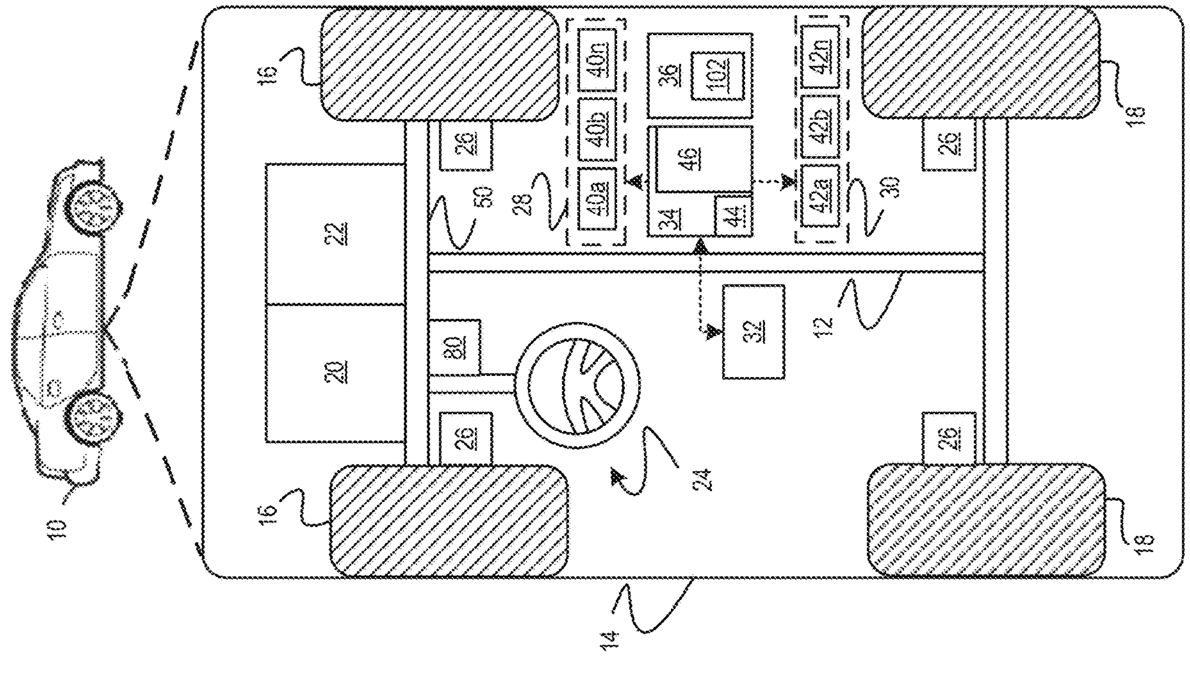
FIG. 1 is a functional block diagram of a vehicle including a wideband spiral antenna system in accordance with at least one embodiment.

Referring to FIG. 1, a functional block diagram of a vehicle 10 including a wideband spiral antenna system 102 in accordance with at least one embodiment is shown. The vehicle 10 generally includes a chassis 12, a body 14, front wheels 16, and rear wheels 18. While the vehicle 10 is depicted in the illustrated embodiment as a passenger car, the vehicle 10 may be other types of vehicles including trucks, sport utility vehicles (SUVs), and recreational vehicles (RVs).

In various embodiments, the body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The controller 34 is configured to implement an automated driving system (ADS). The propulsion system 20 is configured to generate power to propel the vehicle. The propulsion system 20 may, in various embodiments, include an internal combustion engine, an electric machine such as a traction motor, a fuel cell propulsion system, and/or any other type of propulsion configuration. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16-18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16.

The sensor system 28 includes one or more sensing devices 40*a*-40*n* that sense observable conditions of the exterior environment and/or the interior environment of the vehicle 10. The sensing devices 40*a*-40*n* can include, but are not limited to, radars, lidars, global positioning systems, optical cameras, thermal cameras, ultrasonic sensors, and/or other sensors.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16-18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate.

The actuator system 30 includes one or more actuator devices 42*a*-42*n* that control one or more vehicle features such as, but not limited to, the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. In at least one embodiment, the communication system 36 includes a wideband spiral antenna system 102 that is communicatively coupled to a vehicle radio and is configured to accommodate 5G New Radio (NR) multiple-in, multiple-out MIMO operation.

The data storage device 32 stores data for use in the ADS of the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, the controller(s) 34 are configured to implement ADS.

Figure 2:
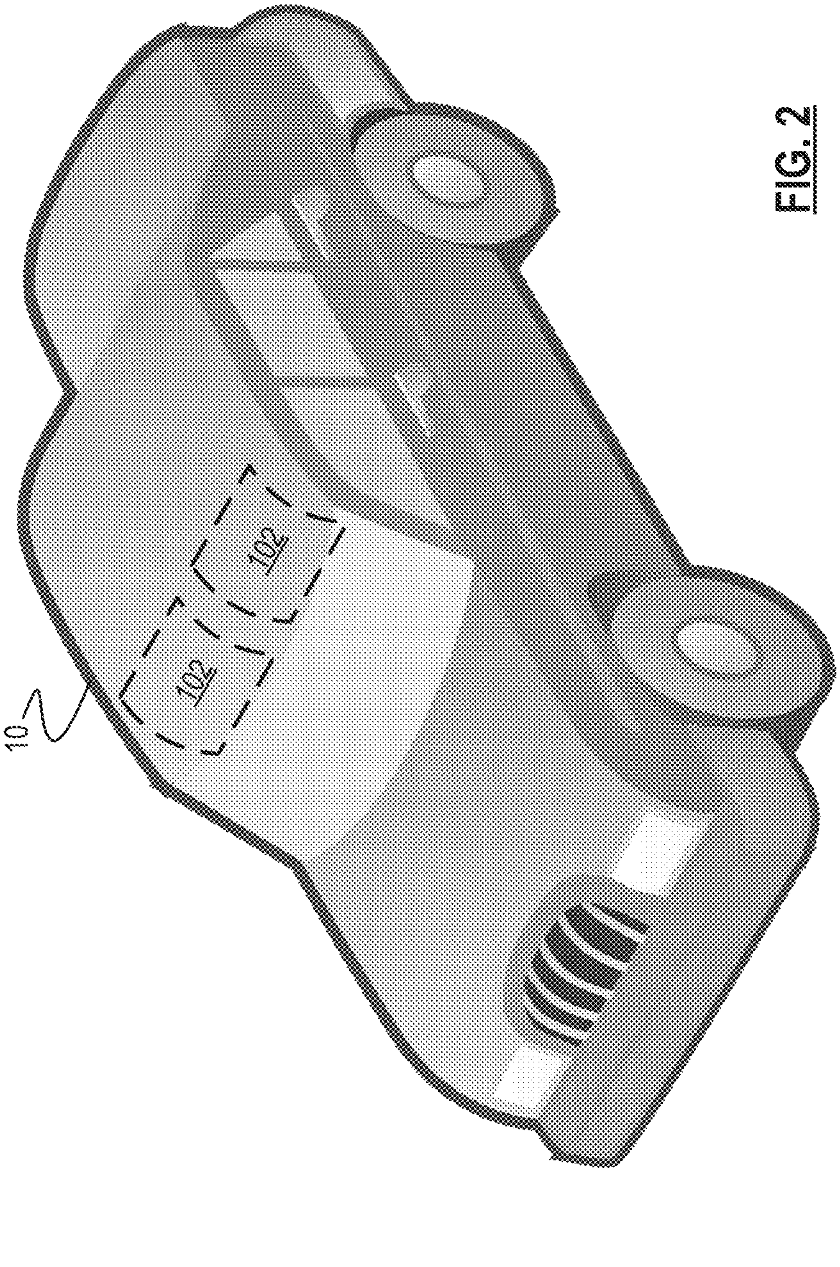
FIG. 2 is a perspective view of an exemplary vehicle including two wideband spiral antenna systems accordance with at least one embodiment.

Referring to FIG. 2, a perspective view of an exemplary vehicle 10 including two wideband spiral antenna systems 102 accordance with at least one embodiment is shown. The two wideband antenna systems 102 are integrated with a curved surface of a roof of the vehicle 10. The wideband spiral antenna system 102 is designed to conform to a geometry of a surface of the vehicle 10. In at least one embodiment, the wideband spiral antenna system 102 has a bandwidth with a frequency range from 612 megahertz (band n105) to 7125 megahertz (band n104). The frequency range covers the 5G New Radio (NR) NR FR1 band. The wideband spiral antenna system 102 is configured to transmit and receive signals around the vehicle 10 and at elevation angles typical between vehicles 10 and cellular base stations.

The wideband spiral antenna system 102 includes a planar spiral antenna fabricated on a substrate. In at least one embodiment, a single dielectric panel is disposed adjacent to the substrate. In various embodiments, a combination of the substrate and the single dielectric panel is conformable to a curved surface of the vehicle 10. In various embodiments, the substrate including the planar spiral antenna is conformable to a curved surface of a single dielectric panel where the single dielectric panel is a curved surface of the vehicle 10.

In various embodiments, the substrate is disposed between two dielectric panels. In at least one embodiment, the planar spiral antenna is applied as an applique affixed to an inside surface of a single dielectric panel. In at least one embodiment, the wideband antenna system 102 is disposed within the vehicle 10. In various embodiments, the combination of the substrate and the two dielectric panels is conformable to a curved surface of the vehicle 10. In various embodiments, the substrate including the planar spiral antenna is conformable to a curved surface where one or both of the two dielectric panels are part of the curved surface of the vehicle 10. Examples of curved surfaces of the vehicle 10 include, but are not limited to, a vehicle hood, a vehicle trunk, a vehicle fender, and a vehicle roof. The placement of the planar spiral antenna between the two dielectric panels reduces the prominence and/or visibility of the planar spiral antenna on a vehicle 10.

The dielectric panels are manufactured using materials that are typically used in automotive structures. Examples of the dielectric panels include, but are not limited to glass panels, fiberglass panels, and fiberglass composite panels.

Figure 3:
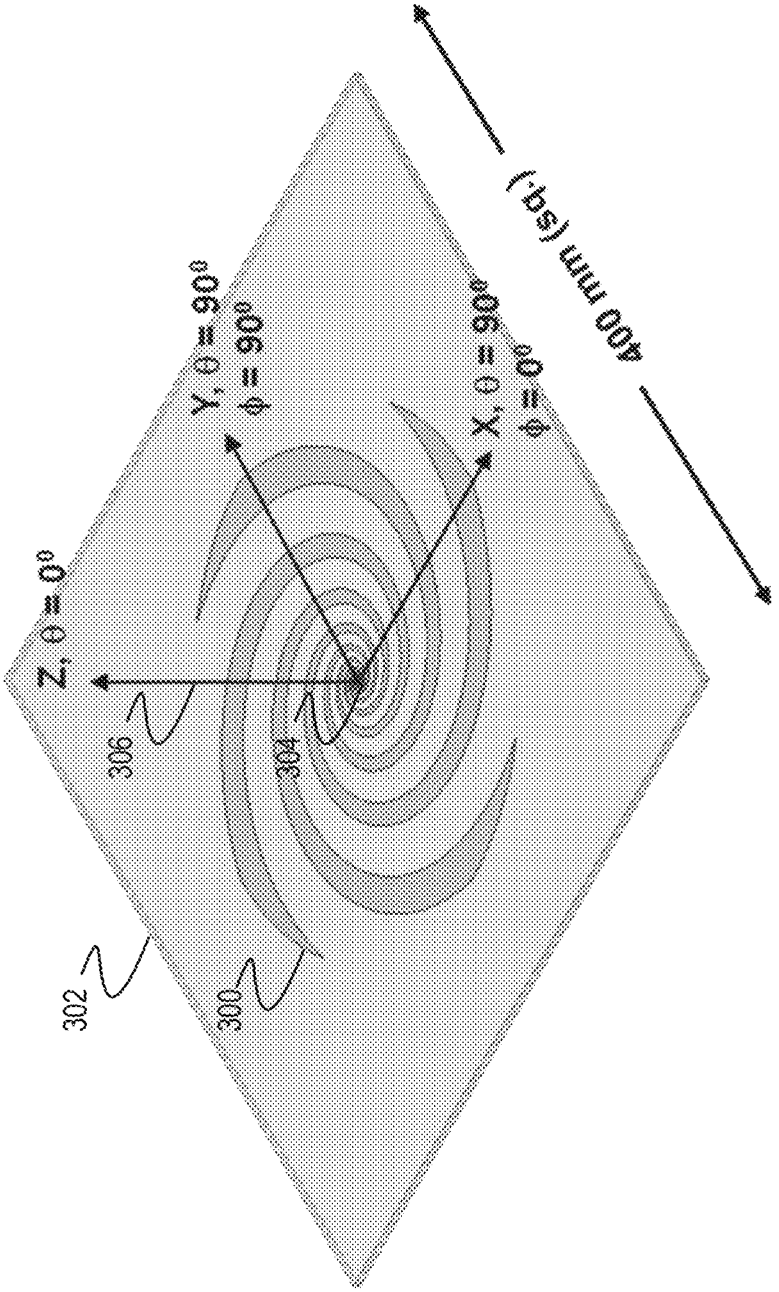
FIG. 3 is a perspective view of a planar spiral antenna fabricated on a substrate in accordance with at least one embodiment.

Referring to FIG. 3, a perspective view of a planar spiral antenna 300 fabricated on a substrate 302 in accordance with at least one embodiment is shown. In at least one embodiment, the spiral planar antenna 300 is a logarithmic periodic spiral antenna. In various embodiments, the spiral planar antenna 300 is a four-arm spiral antenna. In alternative embodiments, the spiral planar antenna may include a few or greater number of arms. In at least one embodiment, the substrate 302 is a thin dielectric circuit board. In at least one embodiment, a thickness of the thin dielectric circuit board is 0.25 mm. In at least one embodiment, the substrate 302 is a flexible film. The planar spiral antenna 300 includes an antenna feed 304.

For each arm of the planar spiral antenna 300 the distance, r, of arm centerline from the center of the spiral follows the general equation shown below.

$$i.\ r = R_0 e^{\alpha(\phi-\phi n)}$$

$R_0$ is the starting radius of the antenna. $R_0$ is determined by the highest frequency of interest. $\alpha$ is the spiral growth rate. $\Phi$n is the starting angle of the nth arm of the planar spiral antenna 300 in reference to a coordinate system 306. The length of each spiral arm, the maximum $\phi$ for the design, is determined by the lowest frequency of interest. The edges of the planar spiral antenna 300 are also determined by the general equation and can be drawn in computer aided modeling software. In at least one embodiment, the input impedance of the planar spiral antenna 300 is 50 ohms. In various embodiments, a tip-to-tip distance of the planar spiral antenna 300 of 331 mm is suitable for operation at 612 megahertz and fits within a square area that is less than or equal to a 400 mm by 400 mm.

With reference to the coordinate system 306, the antenna patterns in the planes of the planar spiral antenna 300 are specified by $\phi=0°$ and $\phi=90°$. The antenna operates in what is known in the art as the second radiation mode so that there is an expected null at $\theta=0°$ and since there is no ground plane, there is a null at $\theta=180°$ as well. The wideband spiral antenna system 102 gain is predominantly omnidirectional at low frequencies but begin to become less omnidirectional at higher frequencies. Part of this is due to surface waves generated with the flat panels and part is due to the structure of the antenna feed circuit. In actual structures, any generated waves would radiate before reaching the edge of the structure because of complex curvatures and thus the radiation pattern will remain mostly omnidirectional.

Figure 4:
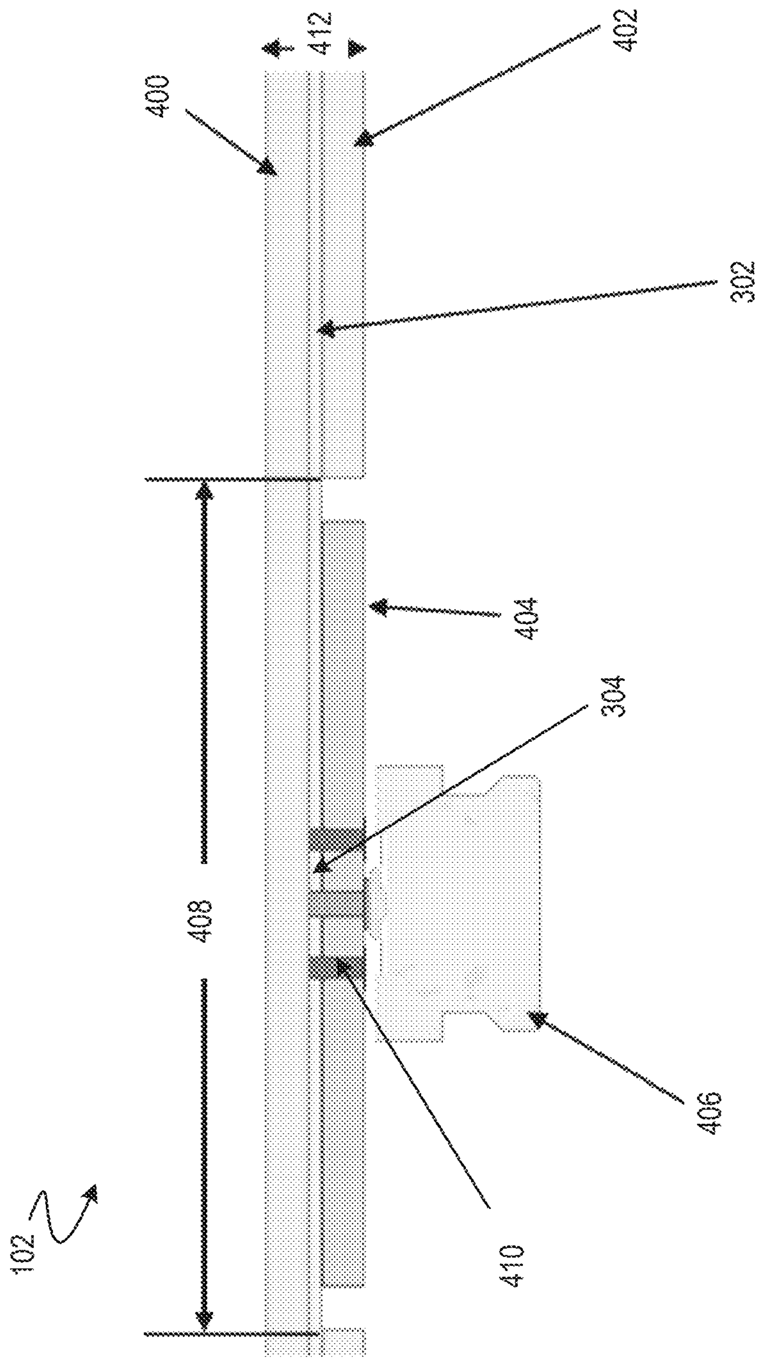
FIG. 4 is a cross-sectional view of a wideband spiral antenna system at an antenna feed location in accordance with at least one embodiment.

Referring to FIG. 4, a cross-sectional view of a wideband spiral antenna system 102 at an antenna feed 304 location in accordance with at least one embodiment is shown. The wideband spiral antenna system 102 includes a substrate 302 with the planar spiral antenna 300 fabricated on the substrate 302, a top dielectric panel 400, a bottom dielectric panel 402, a dielectric puck 404, and a radio frequency (RF) connector 406. The top dielectric panel 400 is disposed adjacent to a first side of the substrate 302. The bottom dielectric panel 402 is disposed adjacent to a second side of the substrate 302. The first side of the substrate 302 and the second side of the substrate 302 are on opposing sides of the substrate 302. In at least one embodiment, the top and bottom dielectric panels 400, 402 are bonded to the substrate 302 in a laminating press. In at least one embodiment, a thickness of the top dielectric panel 400 is the same as a thickness of the bottom dielectric panel 402. In at least one embodiment, a thickness of the top dielectric panel 400 is different from a thickness of the bottom dielectric panel 402. In at least one embodiment, the top dielectric panel 400 and the bottom dielectric panel 402 are fiberglass dielectric panels.

The bottom dielectric panel 402 includes a puck cutout 408. In at least one embodiment, the puck cutout 408 is a hole having a diameter of 20 mm. A first puck side of the dielectric puck 404 is disposed adjacent to the antenna feed 304 on the second side of the substrate 302. The dielectric puck 404 extends through the puck cutout 408 of the bottom dielectric panel 402. The RF connector 406 is disposed adjacent to a second puck side of the dielectric puck 404. The first puck side of the dielectric puck 404 and the second puck side of the dielectric puck 404 are disposed on opposing sides of the dielectric puck 404.

The diameter of the dielectric puck 404 is small enough to allow the wideband spiral antenna system 102 sufficient flexibility to conform to a curved surface of the vehicle 10. In at least one embodiment, a thickness of the dielectric puck 404 is 1 mm. In at least one embodiment, the dielectric puck 404 has a diameter of 18 mm. In at least one embodiment, a thickness of the dielectric puck 404 is 0.75 mm. In at least one embodiment, a thickness of the bottom dielectric 402 is the same as a thickness of the dielectric puck 404. In at least one embodiment, a total thickness 412 of the top dielectric panel 400, the substrate 302, and the bottom dielectric panel is 2.35 mm. The use of a dielectric puck 404 enables a bandwidth of the wideband spiral antenna system 102 to be at the 5G NR bandwidth frequencies.

Conductive vias 410 are fabricated using commercially available printed circuit board processes and extend from the antenna feed 304 through the dielectric puck 404 to the RF connector 406. The vias 410 electrically couples the antenna feed 304 to the RF connector 406. In at least one embodiment, the RF connector 406 is a coaxial RF connector. The RF connector 406 is used for attachment of an RF coaxial cable to connect the antenna feed 304 of the planar spiral antenna 300 to a 5G NR radio. In at least one embodiment, the RF connector 406 is a sub-miniature push (SMP) surface mount connector. In at least one embodiment, the RF connector 406 is soldered to the puck 404.

In at least one embodiment, the substrate 302 is a thin dielectric circuit board. In at least one embodiment, a thickness of the thin dielectric circuit board is 0.25 mm. In at least one embodiment, the substrate 302 is a flexible film. The substrate 302 is flexible so that the planar spiral antenna 300 can conform to a geometry of a curved surface. In at least one embodiment, the geometry of the top dielectric panel 400 and the bottom dielectric panel 402 defined the geometry of the curved surface. In at least one embodiment, the top dielectric panel 400 and the bottom dielectric panel 402 are shaped to a desired complex curvature using a process, such as for example thermosetting. The substrate 302 is flexible enough to conform to the complex curvature. In at least one embodiment, the top dielectric panel 400 and the bottom dielectric panel 402 are vehicle panels and the planar spiral antenna 300 is disposed between the vehicle panels.

Figure 5:
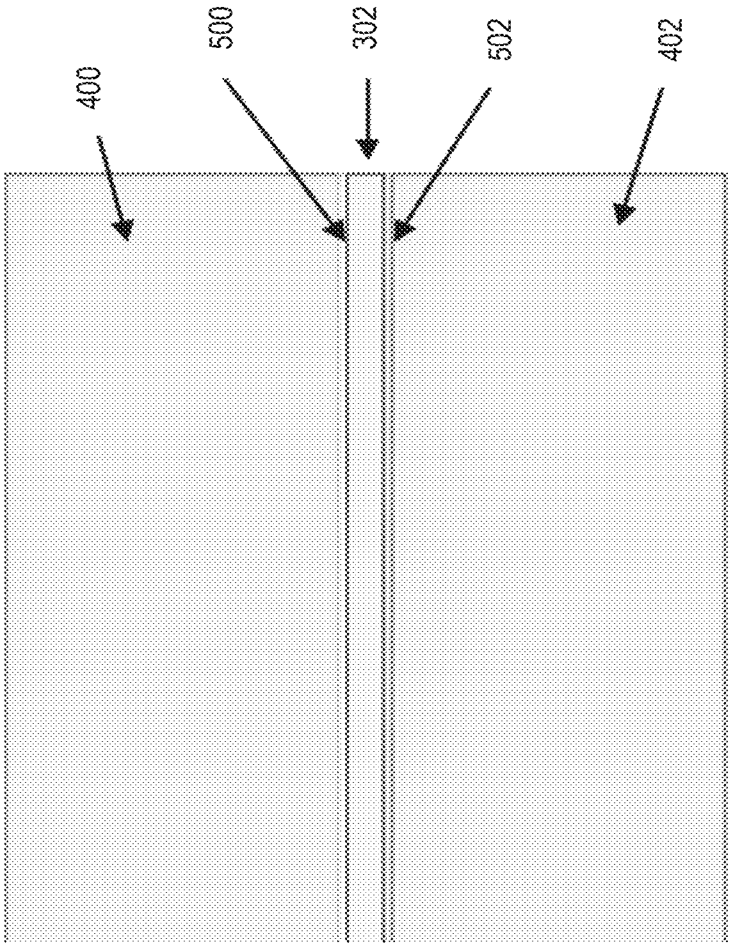
FIG. 5 is a cross-sectional view of a material stack-up of a wideband spiral antenna system in accordance with at least one embodiment.

Referring to FIG. 5, a cross-sectional view of a material stack-up of a wideband spiral antenna system 102 in accordance with at least one embodiment is shown. The material stack-up of the wideband spiral antenna system 102 includes a substrate 302 with the fabricated planar spiral antenna 300 disposed between a top dielectric panel 400 and a bottom dielectric panel 402. In at least one embodiment, the top dielectric panel 400 and the bottom dielectric panel 402 are fiberglass panels. The use of fiberglass is of interest to the automotive community since vehicle structures, such as for example, vehicle hoods, vehicle roofs, vehicle trunks, and vehicle fenders are often manufactured using fiberglass panels. In addition, fiberglass panels can be easily laminated together with the substrate 302.

In at least one embodiment, the top dielectric panel 400 has a thickness of 1 mm. In at least one embodiment, the bottom dielectric panel has a thickness of 1 mm. In at least one embodiment, the top dielectric panel has a dielectric constant of 4.36. In at least one embodiment, the bottom dielectric panel has a dielectric constant of 4.36. In at least one embodiment, the substrate 302 has a thickness of 0.25 mm. In at least one embodiment, the substrate 302 has a dielectric constant of 3.68.

In at least one embodiment, a top lamination resin 500 surrounds the copper traces associated with the planar spiral antenna 300 on an upper surface of the substrate 302. In at least one embodiment, a bottom lamination resin 502 covers the lower surface of the substrate 300 up to the dielectric puck 404. In at least one embodiment, the top lamination resin 500 has a dielectric constant of 3.5. In at least one embodiment, the bottom lamination resin 502 has a dielectric constant of 3.5.

Figure 6:
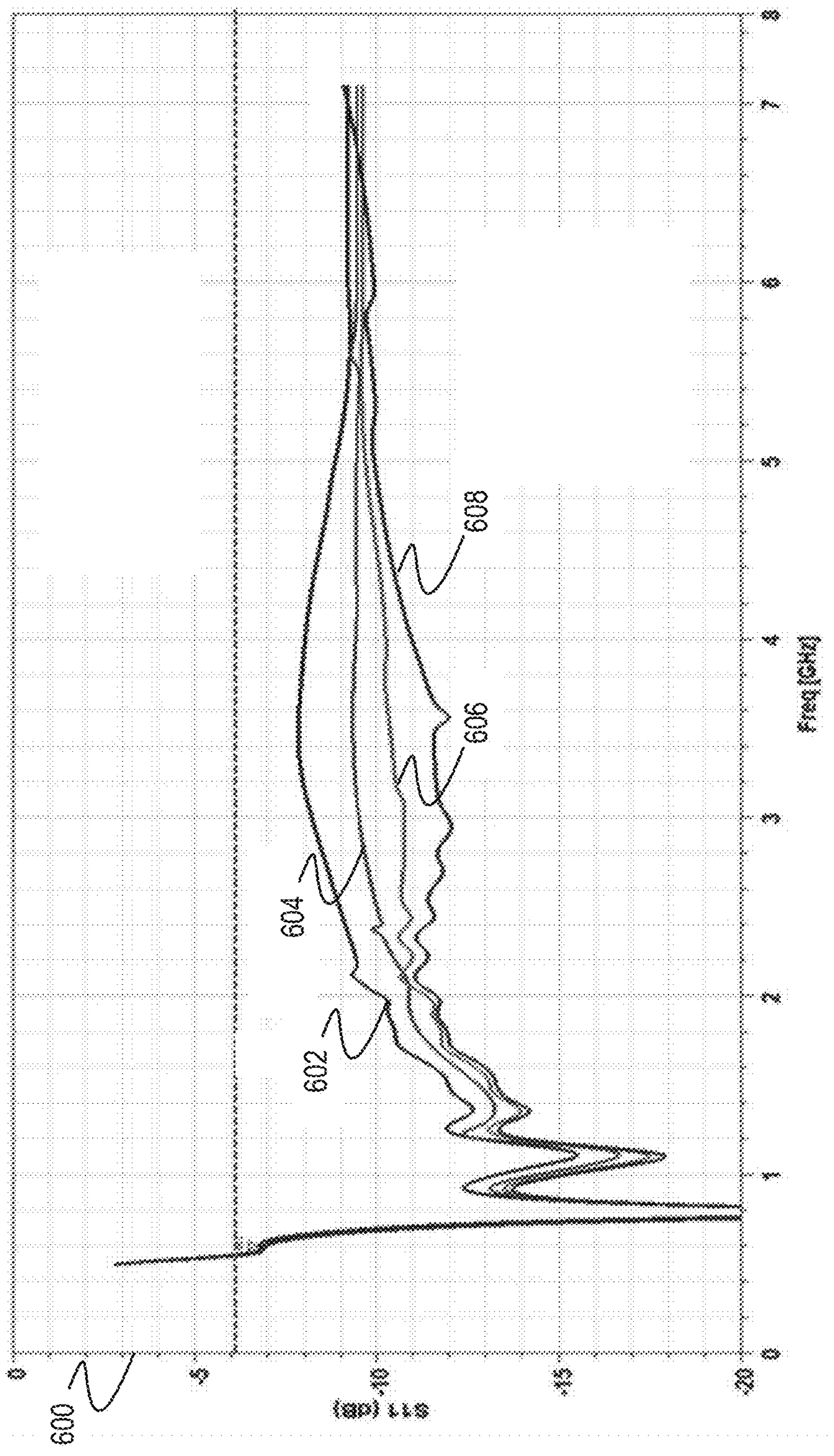
FIG. 6 is a graphical representation of a simulated impendence match for a wideband spiral antenna system with varying dielectric puck thicknesses in accordance with at least one embodiment.

Referring to FIG. 6, a graphical representation of a simulated impendence match 600 for a wideband spiral antenna system 102 with varying dielectric puck thicknesses in accordance with at least one embodiment is shown. The graph 600 depicts reflection coefficient (S11) as a function of frequency (GHz). The curve 602 depicts a relationship between the reflection coefficient as a function of frequency for a dielectric puck thickness of 0.25 mm of the dielectric puck 404. The curve 604 depicts a relationship between the reflection coefficient as a function of frequency for a dielectric puck thickness of 0.5 mm of the dielectric puck 404. The curve 606 depicts a relationship between the reflection coefficient as a function of frequency for a dielectric puck thickness of 0.75 mm of the dielectric puck 404. The curve 608 depicts a relationship between the reflection coefficient as a function of frequency for a dielectric puck thickness of 1.0 mm of the dielectric puck 404. The reflection coefficient decreases as the dielectric puck thickness of the dielectric puck 404 is increased. As can be seen, dielectric puck thicknesses of 0.75 mm and 1.0 mm provide the best impedance match for the wideband spiral antenna system 102 at higher frequencies.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A wideband spiral antenna system for a vehicle comprising:

a planar spiral antenna fabricated on a substrate, the planar spiral antenna comprising an antenna feed;

a first dielectric panel disposed adjacent to a first side of the substrate;

a dielectric puck having a first puck side disposed adjacent to the antenna feed on a second side of the substrate opposing the first side of the substrate;

a radio frequency (RF) connector disposed adjacent to a second puck side of the dielectric puck, the second puck side opposing the first puck side of the dielectric puck; and one or more conductive vias extending from the antenna feed through the dielectric puck to the RF connector electrically coupling the antenna feed to the RF connector.

2. The wideband spiral antenna system of claim 1, wherein the planar spiral antenna comprises a logarithmic periodic spiral antenna.

3. The wideband spiral antenna system of claim 2, wherein the logarithmic periodic spiral antenna comprises a four-arm spiral antenna.

4. The wideband spiral antenna system of claim 1, further comprising a second dielectric panel disposed adjacent to the second side of the substrate, the second dielectric panel having a puck cutout with the dielectric puck extending through the puck cutout.

5. The wideband spiral antenna system of claim 4, wherein a combination of the planar spiral antenna fabricated on the substrate, the first dielectric panel, and the second dielectric panel are conformable to a curved surface.

6. The wideband spiral antenna system of claim 4, wherein a first thickness of the dielectric puck is the same as a second thickness of the second dielectric panel.

7. The wideband spiral antenna system of claim 4, wherein the first and second dielectric panels comprise one of glass panels, fiberglass panels, and fiber composite panels.

8. The wideband spiral antenna system of claim 4, wherein the wideband spiral antenna system is disposed within the vehicle.

9. The wideband spiral antenna system of claim 4, wherein the first and second dielectric panels comprise first and second dielectric panels of the vehicle.

10. The wideband spiral antenna system of claim 1, wherein the planar spiral antenna is applied as an applique affixed to an inside surface of the first dielectric panel.

11. The wideband spiral antenna system of claim 1, wherein a combination of the planar spiral antenna fabricated on the substrate and the first dielectric panel are conformable to a curved surface.

12. The wideband spiral antenna system of claim 1, wherein the substrate comprises one of a flexible film and a thin dielectric circuit board.

13. The wideband spiral antenna system of claim 1, wherein a bandwidth of the wideband spiral antenna system is from 612 megahertz to 7125 megahertz.

14. The wideband spiral antenna system of claim 1, wherein the dielectric puck has a thickness of 1 mm.

15. A vehicle including a wideband spiral antenna system, the wideband spiral antenna system comprising:

a planar spiral antenna fabricated on a substrate, the planar spiral antenna comprising an antenna feed;

a first dielectric panel disposed adjacent to a first side of the substrate;

a dielectric puck having a first puck side disposed adjacent to the antenna feed on a second side of the substrate opposing the first side of the substrate;

a radio frequency (RF) connector disposed adjacent to a second puck side of the dielectric puck, the second puck side opposing the first puck side of the dielectric puck; and one or more conductive vias extending from the antenna feed through the dielectric puck to the RF connector electrically coupling the antenna feed to the RF connector.

16. The vehicle of claim 15, further comprising a second dielectric panel disposed adjacent to the second side of the substrate, the second dielectric panel having a puck cutout with the dielectric puck extending through the puck cutout.

17. The vehicle of claim 15, wherein the planar spiral antenna is applied as an applique affixed to an inside surface of the first dielectric panel.

18. The vehicle of claim 16, wherein a combination of the planar spiral antenna fabricated on the substrate, the first dielectric panel, and the second dielectric panel are conformable to a curved surface of the vehicle.

19. The vehicle of claim 16, wherein the wideband spiral antenna system is disposed within the vehicle.

20. A wideband spiral antenna system for a vehicle comprising:

a planar spiral antenna fabricated on a substrate, the planar spiral antenna comprising an antenna feed;

a first dielectric panel disposed adjacent to a first side of the substrate;

a dielectric puck having a first puck side disposed adjacent to the antenna feed on a second side of the substrate opposing the first side of the substrate;

a radio frequency (RF) connector disposed adjacent to a second puck side of the dielectric puck, the second puck side opposing the first puck side of the dielectric puck;

one or more conductive vias extending from the antenna feed through the dielectric puck to the RF connector electrically coupling the antenna feed to the RF connector; and a second dielectric panel disposed adjacent to the second side of the substrate, the second dielectric panel having a puck cutout with the dielectric puck extending through the puck cutout.

* * * * *